Sept. 8, 1925.
O. A. ANDERSON
GEAR SHIFT LEVER
Original Filed April 25, 1921
1,552,411
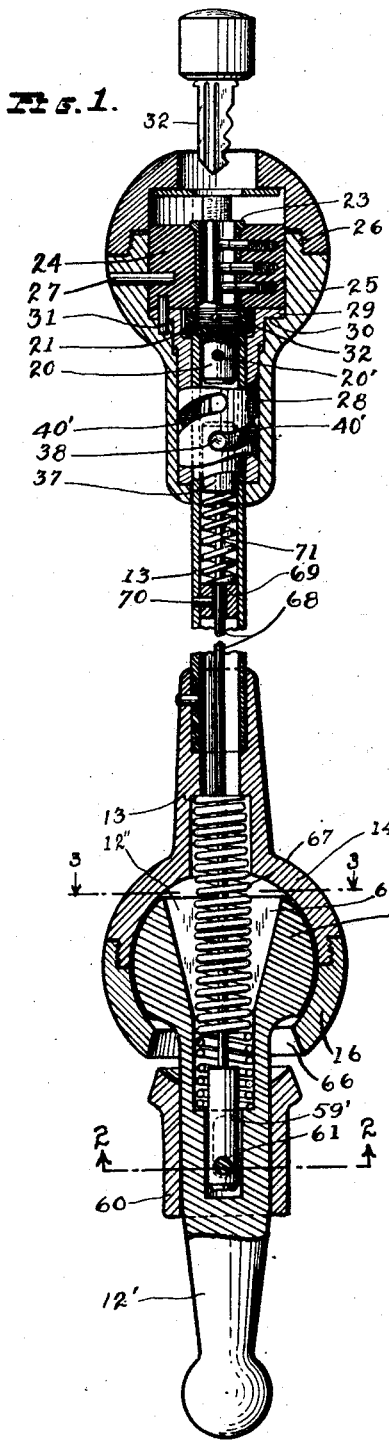
Inventor
O. A. Anderson.

Patented Sept. 8, 1925.

1,552,411

UNITED STATES PATENT OFFICE.

OLAF A. ANDERSON, OF HAMILTON, OHIO.

GEAR-SHIFT LEVER.

Original application filed April 25, 1921, Serial No. 464,121. Divided and this application filed June 9, 1922. Serial No. 566,988.

*To all whom it may concern:*

Be it known that I, OLAF A. ANDERSON, a citizen of the United States, and a resident of Hamilton, county of Butler, State of Ohio, have invented certain new and useful Improvements in Gear-Shift Levers, of which the following is a specification.

This invention relates to locking devices for motor vehicles and more particularly to devices for rendering the usual gear-shift lever of a motor vehicle inoperative.

One of the objects of the invention is to provide a device of the type referred to by which the gear-shift lever may be rendered inoperative in any of its positions and without regard to whether the gears are in mesh or in neutral. A further object of the invention is to provide a locking device which will render the gear-shift lever ineffective to shift the gears although permitting the lever to be moved freely in one plane.

Another object of the invention is to provide a locking device which may be controlled by a key adapted to be inserted in a lock at the top of the gear-shift lever and in which the key will be entirely housed within the usual knob at the top of the lever when the lever is operative.

Other objects of the invention and the features of novelty will be apparent from the following description taken in connection with the accompanying drawings, of which:

Figure 1 is a longitudinal section through a lever embodying my invention;

Fig. 2 is a transverse section on the line 2—2 of Fig. 1; and

Fig. 3 is a section on the line 3—3 of Fig. 1.

This application is a division of my application 464,121, filed April 25, 1921.

The form of the invention illustrated comprises a lever formed in two sections, the section 12' representing the gear-shifting section and the section 13 the handle. These two sections are secured together by a ball and socket joint which consists of the ball 15' on the section 12' and the socket in the part 14 on the section 13. As will be noted from the drawings the part 14 has a spherical exterior and is thus adapted for universal movement in a suitable socket in the transmission casing of the vehicle.

The sections 12' and 13' are provided with aligned openings on opposite sides of the ball and socket joint connecting the sections and in these openings there is arranged a coil spring 67 which not only exerts a separating pressure on the sections but prevents relative swinging movement between the sections except in a single plane and the movement in this plane is permitted by the enlargement of the opening in the sections 12', as indicated at 12''. As will be noted from Fig. 3, the opening 12'' is elongated although the sides thereof closely fit the spring 67.

The ball 15' is retained in the socket in the part 14 by means of the member 16 which has an opening 66 through which the section 12' projects and which is adapted to receive the flange at the top of the member 60, to rigidly connect the sections together and prevent relative swinging movement therebetween. A plunger 59' is slidably arranged in the section 12' and is connected with the member 60 by means of a pin 61 which projects through elongated slots 61' in the section 12', these slots permitting movement of the plunger 59' and the member 60 up and down on the section 12'.

Arranged on the upper end of the section 13 is a rotatable knob 25. There is also secured in the upper end of the section 13, by a pin 20', or in any other suitable manner, a plug or adapter 20 which, in turn, has rigidly secured to it, as by the threads 21 and pin 22, the barrel 23 of a pin lock. The cylinder 24 of this lock is housed in an opening in the knob 25, this knob being formed of two sections which are screwed together at 26. The cylinder 24 and the knob 25 are secured together against relative rotation by the pin 27. A sleeve 28 has a flange 29 arranged between the bottom of the cylinder 24 and a shoulder 30 in the knob and is held against rotation relative to the knob by a pin 31. The lock, comprising the barrel 23 and the cylinder 24, therefore, serves to secure the knob 25 against rotation on the handle 13 when the key 32 is removed from the barrel 23, according to the well known principle of the pin lock illustrated.

A flexible rod 68 is attached to the plunger 59' and connects the latter with a block 37 that is slidable in the upper end of the section 13 of the lever and carries a cross pin 38, the opposite ends of which project through elongated slots in the section 13 and into the spiral slots 40′ in the sleeve 28. Thus, when the knob 25 is rotated in the left hand direction, the parts being as shown in Fig. 2, the ends of the cross pin 38 will traverse the spiral slots 40′ and thereby lift the block 37, as well as the plunger 59′ and member 60, until the latter enters the opening 66 and locks the lever sections rigidly together. When the knob 25 is rotated in the opposite direction the member 60 will be withdrawn from the opening 66 and permit one section of the lever to be swung relatively to the other. A spring 71 arranged between the block 37 and a plug 69, secured in the section 13 by the pin 70, normally tends to lift the block 37 and thus tends to move the member 60 into the opening 66.

When the key 32 is removed from the lock the knob 25 is secured against rotation and the parts are so arranged that the key is removed only when the member 60 is out of the opening 66, thereby permitting relative movement of the lever section and preventing the use of the lever for shifting gears. By inserting the key in the lock and rotating the knob 25 the member 60 is caused to enter the opening 66, thereby locking the lever sections together and causing them to act as a unit.

The spring 67, being laterally flexed by a relative swinging movement between the lever sections, from the relation shown in Fig. 1, tends to retain the lever sections, in the relation shown in Fig. 1, when the member 60 is out of the opening 66.

Having thus described my invention what I claim is:

1. In a device of the class described, the combination of a lever comprising two sections hinged together, means whereby said sections may be connected so as to act as a unit, and spring means within said sections adapted to retain them in their normal relation when the first-mentioned means is positioned to permit relative movement between the sections.

2. In a device of the class described, the combination of a lever comprising two sections hinged together by a ball and socket joint, means whereby said sections may be connected so as to act as a unit, and a spring arranged in said ball and socket joint adapted to restrict relative movement between said sections substantially to a single plane and also to retain said sections in their normal relation when the first-mentioned means is positioned to permit relative movement between the sections.

3. In a device of the class described, the combination of a lever comprising two sections connected by a ball and socket joint, means within said sections adapted to restrict relative movement between the sections substantially to a single plane, and a member slidable on the exterior of one of said sections into engagement with the other section to prevent relative movement between the sections in said plane.

4. In a device of the class described, the combination with a lever comprising a plurality of sections connected by a ball and socket joint, the socket of one section having a relatively large opening through which the other section projects and which permits relative movement between the sections, of a member slidable on said other section into said opening and adapted to prevent relative movement between the sections.

5. In a device of the class described, the combination with a lever comprising a plurality of sections connected by a ball and socket joint, the socket of one section having a relatively large opening through which the other section projects and which permits relative movement between the sections, of a member slidable on said other section into said opening and adapted to prevent relative movement between the sections, and means slidably arranged in said sections and connected with said member for actuating the latter.

6. In a device of the class described, the combination of a lever comprising two sections hinged together and having normally aligned openings therein, a coil spring arranged in said openings and adapted to yieldingly hold said sections in their normal relation, and means for rigidly connecting said sections so that they will act as a unit.

7. In a device of the class described, the combination of a lever comprising two sections hinged together by a ball and socket joint and having longitudinally extending openings therein, a coil spring in said openings to yieldingly retain said sections in their normal relation, one of said sections having the said opening therein enlarged to permit said section to have a swinging movement in a single plane relative to the other section, and means for rigidly connecting said sections so that they will act as a unit.

8. In a device of the class described, the combination of a lever comprising two sections hinged together and adapted for relative swinging movement in a single plane, said sections having aligned openings on opposite sides of the joint therebetween, a coil spring arranged in said openings and adapted to be laterally flexed by the relative swinging movements of said sections, means for rigidly connecting said sections so that they will act as a unit, and a flexible rod extending through said coil spring and connected with the last-mentioned means for actuating the same.

In testimony whereof I affix my signature.

OLAF A. ANDERSON.